United States Patent
Col et al.

(10) Patent No.: US 7,076,639 B2
(45) Date of Patent: Jul. 11, 2006

(54) APPARATUS AND METHOD FOR MASKED MOVE TO AND FROM FLAGS REGISTER IN A PROCESSOR

(75) Inventors: Gerard M. Col, Austin, TX (US); G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 653 days.

(21) Appl. No.: 10/279,207

(22) Filed: Oct. 22, 2002

(65) Prior Publication Data

US 2005/0262330 A1    Nov. 24, 2005

Related U.S. Application Data

(60) Provisional application No. 60/345,455, filed on Oct. 23, 2001.

(51) Int. Cl.
*G06F 9/00*    (2006.01)
(52) U.S. Cl. .......................................... 712/225; 712/5
(58) Field of Classification Search ................ 712/225, 712/5, 41, 224
See application file for complete search history.

(56) References Cited

U.S. PATENT DOCUMENTS

| | | | |
|---|---|---|---|
| 5,535,408 A * | 7/1996 | Hillis | 712/16 |
| 5,805,853 A | 9/1998 | White et al. | |
| 5,826,069 A * | 10/1998 | McCullough et al. | 712/220 |
| 6,026,484 A * | 2/2000 | Golston | 712/226 |
| 6,047,369 A | 4/2000 | Colwell et al. | |
| 6,145,075 A | 11/2000 | Henry et al. | |
| 6,370,596 B1 | 4/2002 | Dakhil | |
| 6,393,546 B1 | 5/2002 | Witt et al. | |
| 2005/0228974 A1 | 10/2005 | Col et al. | |

\* cited by examiner

*Primary Examiner*—Henry W. H. Tsai
(74) *Attorney, Agent, or Firm*—Richard K. Huffman; James W. Huffman

(57) ABSTRACT

A method and apparatus are provided for writing to a flags register in a pipeline microprocessor. Responsive to a macro instruction that directs a write to the flags register, a mask is generated using destination information for the write and privilege level information for the write, where the mask permits updates of particular bits within the flags register that are appropriate for the current operating mode. The mask is then ANDed with new values for bits within the flags register and the result is written to the flags register in a single instruction cycle.

13 Claims, 5 Drawing Sheets

APPARATUS AND METHOD FOR MASKED MOVE TO AND FROM FLAGS REGISTER IN A PROCESSOR

CROSS-REFERENCE TO RELATED APPLICATIONS

This application claims priority based on U.S. Provisional Application Ser. No. 60/345,455, filed on Oct. 23, 2001, entitled APPARATUS AND METHOD FOR MASKED MOVE TO FLAGS REGISTER.

This application is related to co-pending U.S. patent application Ser. No. 10/279,206 filed on Oct. 22, 2002, entitled APPARATUS AND METHOD FOR MASKED MOVE TO AND FROM FLAGS REGISTER IN A PROCESSOR. The cited application has common inventors and a common assignee.

BACKGROUND OF THE INVENTION

1. Field of the Invention

This invention relates in general to the field of instruction execution in computer systems, and more particularly to a method and apparatus for reducing the number of instruction cycles that are required to perform a write to, and read from, the EFLAGS register.

2. Description of the Related Art

In an x86 pipeline microprocessor, instructions that perform a write to the EFLAGS register (e.g., POPF/POPFD, CLI/STI, CLD/STD, CLC/STC) take a significant number of cycles to execute. This is because writes to the EFLAGS register are conditioned upon the current I/O privilege level (IOPL) and the state of certain bits within the EFLAGS register at the time of a write. Under the Microsoft Windows® operating system, upon each return from a called subroutine the EFLAGS register is popped off of the stack, thus causing a notable operating system delay.

Therefore, what is needed is a technique for operating a microprocessor that reduces the delay associated with instructions that perform a write to the EFLAGS register, such as pop instructions, for example.

It is also observed that in an x86 pipeline microprocessor, a push of the EFLAGS register (i.e., PUSHF/PUSHFD) on to the stack takes a significant number of cycles. This is because the state of the bits that are read from the EFLAGS register and the execution state of the processor are conditioned upon the current I/O privilege level (IOPL) and the state of particular bits within the EFLAGS register at the time of a push. Each call to a subroutine in the Microsoft Windows® operating system causes the EFLAGS register to be pushed to the stack, thus causing a notable operating system delay.

Thus, what is needed is a technique for operating a microprocessor that reduces the delay associated with performing EFLAGS stack pushes which perform a read from EFLAGS.

SUMMARY OF THE INVENTION

In accordance with one embodiment of the present invention, a method for performing a write operation to a multi-bit flag register in a microprocessor is provided. The method includes receiving, by a translate stage of a processor, a macro instruction requesting a write to the multi-bit flag register. The method also includes generating, by the translate stage, a micro instruction that directs execution logic in the microprocessor to write to the multi-bit flag register in a single write cycle. The method further includes accessing a current operating mode and configuring a flag mask that permits updates of particular bits within the multi-bit flag register that are appropriate for the current operating mode.

This invention advantageously reduces the delays experienced by processors attempting to perform performing writes to the EFLAGS register by accomplishing such a write in a single instruction cycle.

In accordance with another embodiment of the present invention, an apparatus in a pipeline microprocessor is provided, for performing a write to a flags register in a single instruction cycle. The apparatus includes translation logic and execution logic. The translation logic receives a macro instruction directing the pipeline microprocessor to perform the write to the flags register, and generates a single micro instruction that directs the pipeline microprocessor to execute the write to the flags register in the single instruction cycle. The execution logic is coupled to the translation logic. The execution logic receives the single micro instruction, and executes the write to the flags register in the single instruction cycle. The execution logic accesses a current operating mode from a privilage register and the state of other bits from the flags register to dynamically generate contents of a TMASK register, where the contents of the TMASK register are configured to allow alteration only of particular bits within the flags register as a function of the current operating mode.

This invention advantageously reduces the delay associated with performing EFLAGS reads such as occur in stack pops to an EFLAGS register in a processor. The disclosed method and apparatus performs EFLAGS stack pops in a single instruction cycle.

Other features and advantages of the present invention will become apparent upon study of the remaining portions of the specification and drawings.

BRIEF DESCRIPTION OF THE DRAWINGS

These and other objects, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
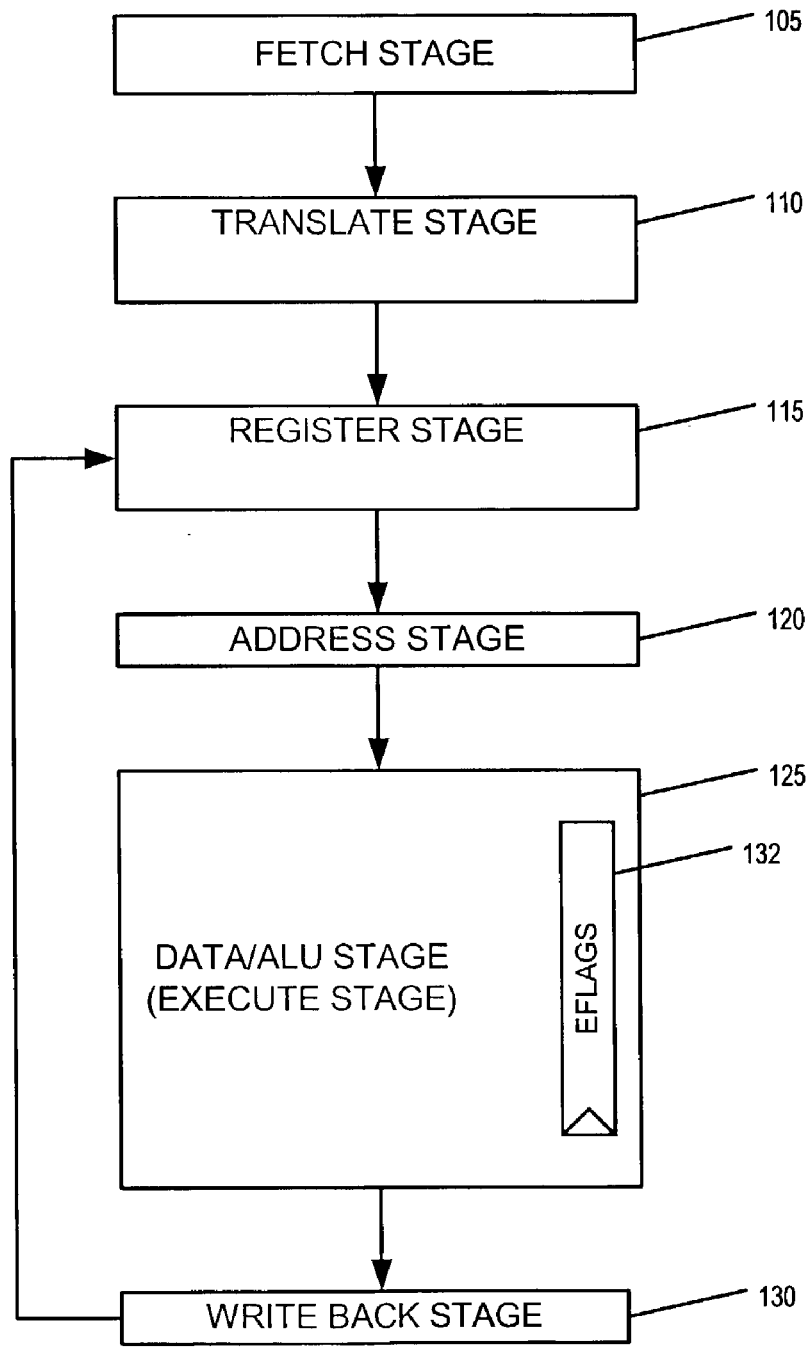
FIG. 1 is a block diagram of the pipeline stages of a conventional microprocessor.

FIG. 1 is a block diagram of a conventional pipelined microprocessor 100 which includes a fetch stage 105, a translate stage 110, a register stage 115, an address stage 120, a data/ALU or execute stage 125, and a write back stage 130.

Operationally, fetch stage 105 fetches macro instructions from memory (not shown) that are to be executed by microprocessor 100. Translate stage 110 translates the fetched macro instructions into associated micro instructions.

Each micro instruction directs microprocessor 100 to perform a specific subtask related to accomplishment of an overall operation specified by a fetched macro instruction. Register stage 115 retrieves operands specified by the micro instructions from a register file (not shown) for use by later stages in the pipeline. Address stage 120 calculates memory addresses specified by the micro instructions to be used in data storage and retrieval operations. Data/ALU stage 125 either performs arithmetic logic unit (ALU) operations on data retrieved from the register file, or reads/writes data from/to memory using the memory address calculated in address stage 120. Write back stage 130 writes the result of a data read operation, or an ALU operation, to the register file. Thus, to review, macro instructions are fetched by fetch stage 105 and are decoded into micro instructions by translate stage 110. The translated micro instructions proceed through stages 115–130 for execution. Pipeline operation is thus provided by microprocessor 100.

To better understand the technology to be disclosed, the discussion below will employ the nomenclature of an x86 microprocessor. However, those skilled in the art will appreciate that use of x86 registers and macro instructions is for illustrative purposes only. Other processors or architectures may be easily substituted for this illustration.

Data/ALU stage 125 includes an EFLAGS register 132 which holds the state of the processor. EFLAGS register 132 is modified by many instructions and is used for comparing parameters, for conditional loops and for conditional jumps. Each bit of the EFLAGS register holds the state of specific parameter of the last instruction. Table 1 below shows the 32 bits which form the EFLAGS register together with the function of each bit.

TABLE 1

| EFLAGS REGISTER BIT NUMBER | NAME | FUNCTION |
| --- | --- | --- |
| 31:22 | Reserved | "tied low" |
| 21 | ID | ID Flag |
| 20 | VIP | Virtual Interrupt Pending |
| 19 | VIF | Virtual Interrupt Flag |
| 18 | AC | Alignment Check |
| 17 | VM | Virutual Mode |
| 16 | RF | Resume Flag |
| 15 | 0 | "tied low" |
| 14 | NT | Nested Task Flag |
| 13:12 | IOPL | I/O Privilege Level |
| 11 | OF | Overflow Flag |
| 10 | DF | Direction Flag |
| 9 | IF | Interrupt Flag Enabled |
| 8 | TF | Trap Flag |
| 7 | SF | Sign Flag |
| 6 | ZF | Zero Flag |
| 5 | 0 | "tied low" |
| 4 | AF | Auxiliary Carry Flag |
| 3 | 0 | "tied low" |
| 2 | PF | Parity Flag (Even Parity) |
| 1 | 1 | "tied high" |
| 0 | CF | Carry Flag |

In a present day pipeline microprocessor such as processor 100, the execution of any of the instructions that perform a write to the EFLAGS register (i.e., POPF/POPFD, CLC/STC, CLD/STD, CLI/STI) requires a significant number of machine cycles. This is because writes to EFLAGS 132 are conditioned upon the current I/O privilege level (IOPL) and the state of certain bits within EFLAGS at the time of a write. More specifically, bits 1, 3, 5, 15, and 22–31 are reserved and their specified states cannot be altered. Additionally, when the processor is operating in protected mode at privilege level 0 (or in real-address mode, which is equivalent to privilege level 0), all of the non-reserved bits can be modified, except the VIP, VIF, and VM bits. The VIP and VIF flags must be cleared, and the VM flag must maintain its current state.

The execution of any of the aforementioned macro instructions that write data to EFLAGS register 132 results in the generation of several micro instructions. In more detail, first a micro instruction is executed to determine the current I/O privilege level (IOPL). Succeeding micro instructions read the current state of certain EFLAGS bits such as VM, RF, IOPL, VIP, VIF and IF and establish bit states for a new value to be written to EFLAGS. A final micro instruction is executed to write the new value to EFLAGS register 132.

The very significant disadvantage of the above described conventional approach for updating the EFLAGS register is that numerous micro instructions must be executed in order to perform a write to the EFLAGS register. Since several microinstructions must be generated and processed, significant time is expended for each update of the EFLAGS register. This takes a negative toll on microprocessor efficiency.

The inventors have recognized that in the Microsoft Windows® operating system the EFLAGS register is popped off the stack each time there is a return from a subroutine. They have also noted the occurrence of many instances of the other instructions that write to the EFLAGS register in today's commonly used desktop application programs. Since these types of instructions are routinely employed, it is very desirable that their associated execution time is minimized.

The purpose of the processor technology disclosed herein is to reduce the number of instruction cycles that are required to perform a write to the EFLAGS register. To achieve this goal, an apparatus and method are provided which dynamically generate an EFLAGS mask. The mask is logically ANDed together with a prescribed operand (i.e. popped EFLAGS register or selected EFLAG bit state) and the result is written to the EFLAGS register. The new processor disclosed herein advantageously uses a single micro instruction, named Move To EFLAGS (MTEF), along with dedicated logic in the execute stage to enable writes to EFLAGS to be executed in a single instruction cycle.

Figure 2:
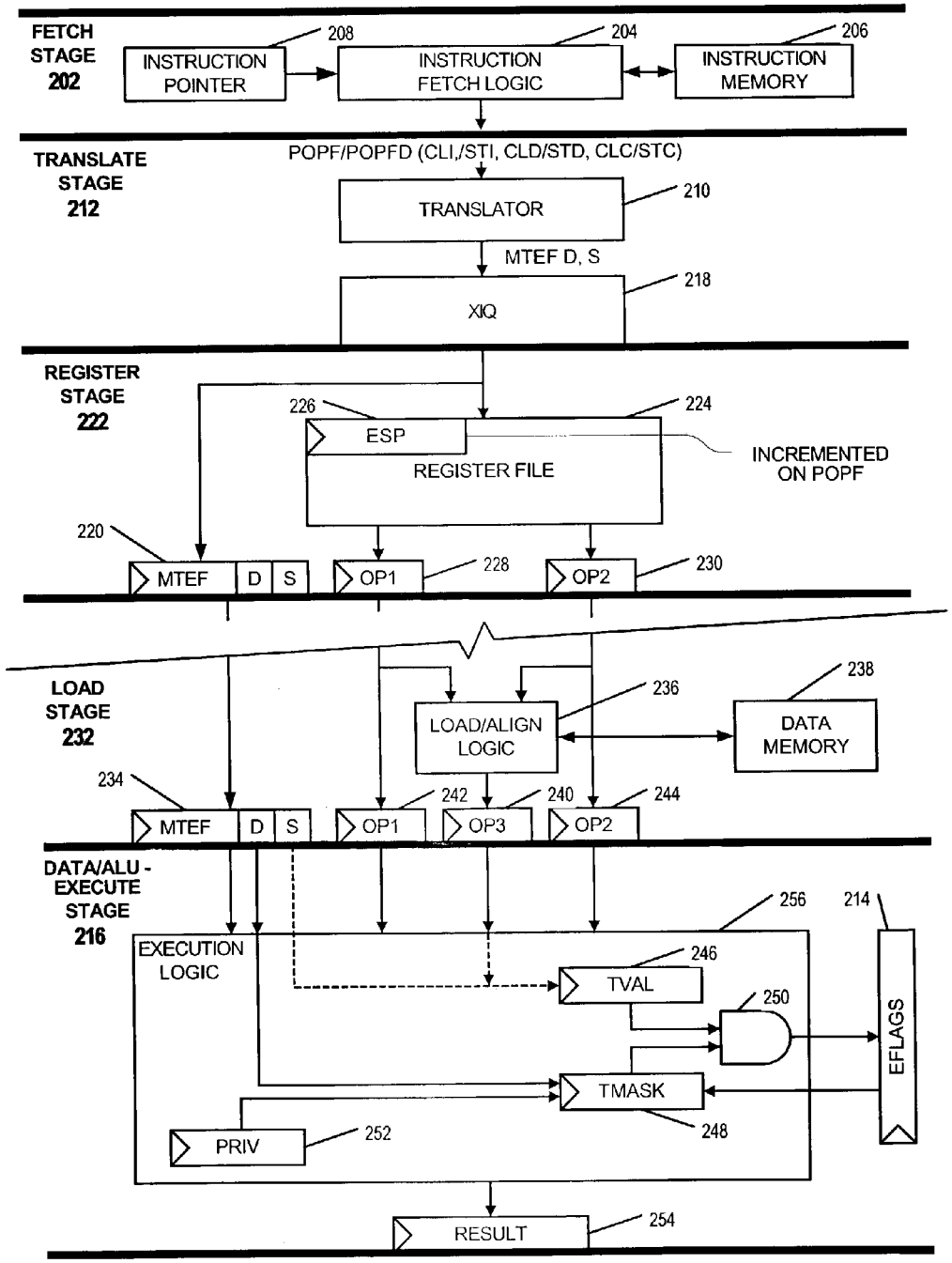
FIG. 2 is a block diagram of one embodiment of the disclosed microprocessor.

FIG. 2 is a block diagram of a processor 200 employing the single micro instruction, Move To EFLAGS (MTEF), to write to the EFLAGS register in a single instruction cycle. Processor 200 includes a fetch stage 202 which incorporates instruction fetch logic 204 coupled to instruction memory 206. An instruction pointer 208 is coupled to fetch logic 204 to instruct fetch logic 204 as to the particular location in memory 206 from which the current instruction is to be fetched.

When fetch logic 204 fetches a macro instruction such as an POPF/POPFD, CLI/STI, CLC/STC, or CLD/STD instruction, translator 210 of translate stage 212 in response generates an MTEF D,S micro instruction which will implement a move to EFLAGS register 214 in data/ALU—execute stage 216. In this MTEF D,S micro instruction, S is a source field which indicates the source of the information to be transferred to EFLAGS register 214. The destination field, D, prescribes the bits in EFLAGS register 214 which are to be written.

The remaining structure of processor 200 will now be discussed before continuing with a discussion of the processing of the MTEF micro instruction. The MTEF D, S micro instruction is provided to translate instruction queue (XIQ) 218 as shown. The MTEF D, S micro instruction flows forward to an MTEF register 220 in register stage 222. Register stage 222 includes a register file 224 which stores the architectural state of processor 200. Register file 224 includes an ESP register 226. Register stage 222 also includes OP1 register 228 and OP2 register 230 as shown.

Register stage 222 is coupled to load stage 232 through an address stage, not explicitly shown. The processor employs a conventional address stage to calculate addresses used in the processing of instructions by processor 200. The contents of MTEF register 220 are fed forward and stored in a corresponding MTEF register 234 in load stage 232. Load stage 232 includes load/align logic 236 which is coupled to OP1 register 228 and OP2 register 230 of register stage 222 as shown. Load align logic 236 is coupled to data memory 238. The output of load/align logic 236 is coupled to OP3 register 240. The contents of OP1 register 228 and OP2 register 230 of register stage 222 are fed forward to OP1 register 242 and OP2 register 244, respectively, of load stage 232 as shown.

Processor 200 also includes a data/ALU or execute stage 216 which includes the aforementioned EFLAGS register 214. Data/ALU stage 216 includes a TVAL register 246 and a TMASK register 248, the contents of which are ANDed together by AND gate 250. The result of this ANDing operation is stored in EFLAGS register 214. The ANDing operation and the operation of the mask supplied by TMASK register 248 will be discussed subsequently. Data/ALU stage 216 includes a privilege level register PRIV 252 which provides privilege information relative to the instruction currently being executed to TMASK register 248. Results from the execution of instructions are provided to result register 254. The results are written back to register file 224 via a result bus (not shown).

As discussed briefly earlier, in response to a fetched POPF/POPFD, CLI/STI, CLC/STC, CLD/STD macro instruction supplied by fetch logic 204 to translator 210, translator 210 generates a single micro instruction, MTEF D, S which is then supplied to translator queue (XIQ) 216 and register stage 222, coupled thereto. The MTEF micro instruction includes a source field, S, and a destination field, D. Destination field D prescribes the bits in EFLAGS register 214 which are to be written. For example, if destination D=0, the D field prescribes a write to the carry flag CF which is bit 0 of EFLAGS register 214 as seen in Table 1. In another example, D=9 specifies a write to the IF bit of the EFLAGS register and D=10 specifies a write to the DF bit of EFLAGS. A pop of EFLAGS register 214 off the stack is prescribed by setting D=31 in the MTEF D, S micro instruction generated by translator 210.

The source field, S, of the MTEF micro instruction prescribes the state of the bits to be written to EFLAGS register 214. For example, D=10 and S=0 directs microprocessor 200 to clear DF. If D=0 and S=1, this directs microprocessor 200 to set the carry flag. In other words, in the MTEF instruction, S=0 indicates a clear of the destination bit and S=1 indicates a set of the destination bit. For a POP EFLAGS instruction, the S field is ignored.

Execution logic 256 in data/ALU execution stage 216 provides for a mask while writing to the EFLAGS register to assure that only the correct bit locations are written. The contents of TMASK register 248 are dynamically generated upon execution of an MTEF micro instruction. Execution logic 256 in data/ALU execute stage 216 accesses the current operating mode from privilege register PRIV 252 and the state of the other bits from EFLAGS register 214. Either the S field value or the EFLAGS register that has been read from the stack in load stage 232 is provided to new value register TVAL 246. As seen in FIG. 2, TVAL is ANDed with TMASK by AND gate 250 and the result is written to EFLAGS register 214. Advantageously, TMASK 248 is configured to alter only those bits that are allowed as a function of the particular current operating mode obtained from PRIV register 252. In this embodiment, the highest privilege level an instruction can have is 3 and accordingly such an instruction would be permitted the highest latitude in updating the specified bits of the EFLAGS register. Instructions exhibiting a lesser privilege level would be provided more restricted latitude as to their ability to update EFLAGS. The lowest privilege level is 0. In one embodiment, the mask includes the same number of bits as the EFLAGS register. If a particular mask bit is set, this means that it can be updated whereas if a particular mask bit is not set, it can not be updated, as per the current privilege level provided by PRIV register 252. In summary, TVAL provides the particular value to be written to EFLAGS and TMASK determines if such a write action is permissible in accordance with the privilege level corresponding to the particular instruction as stored in PRIV register 252.

Advantageously, the disclosed technology provides a technique that allows instructions that write to the EFLAGS register to be executed in a single instruction cycle, thus significantly increasing the throughput of the processor.

Figure 3:
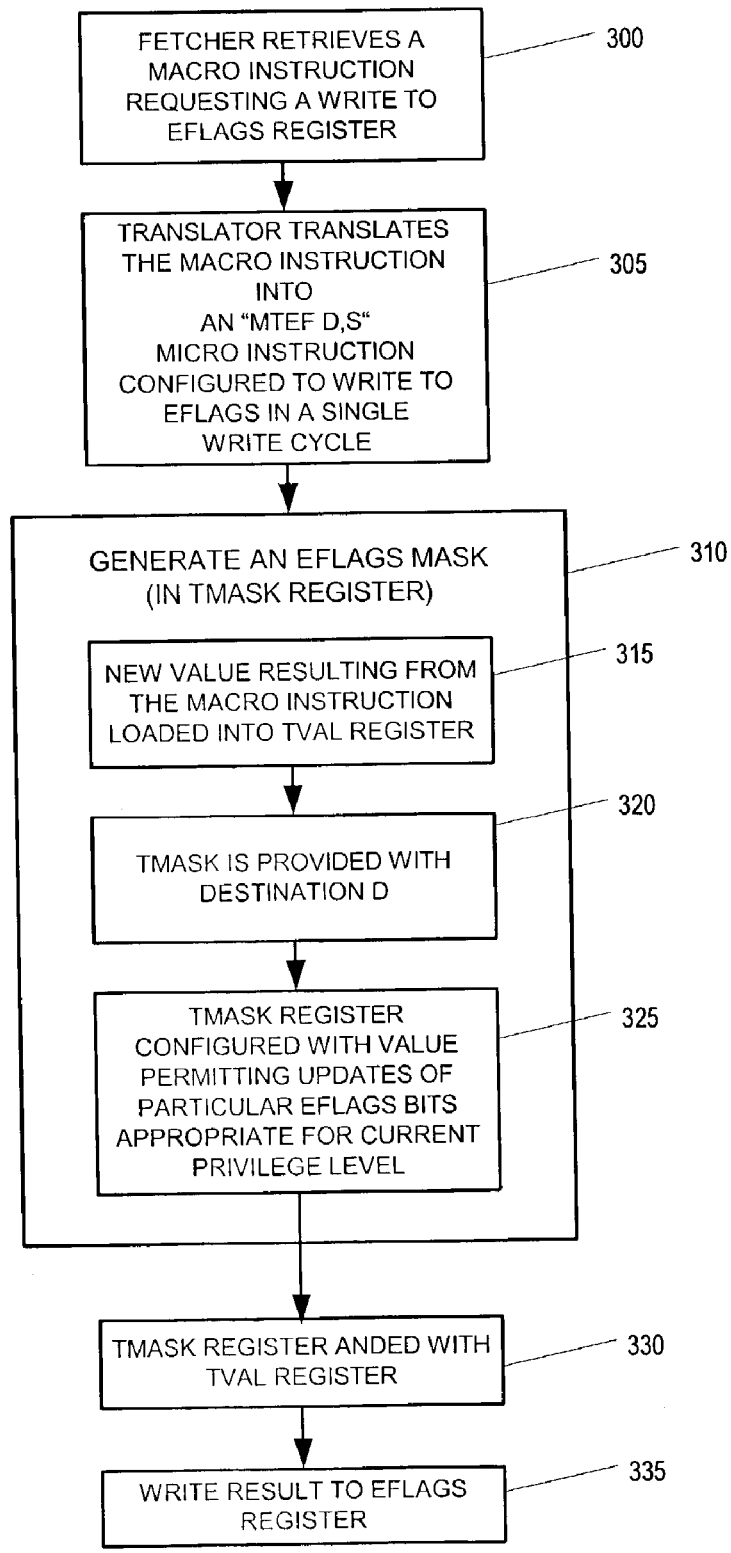
FIG. 3 is a flow chart depicting the operation of the microprocessor of FIG. 2.

FIG. 3 is a flowchart showing a high level summary of the process flow of microprocessor 200 as it carries out a write to the EFLAGS register operation in accordance with the advanced methodology disclosed. A macro instruction such as POPF/POPFD, CLI/STI, CLC/STC, or CLD/STD is fetched from memory as per block 300. This macro instruction results in a request to write to EFLAGS register 214 when the macro instruction is translated by translator 210 as per block 305. An EFLAGS mask is then generated in the EFLAGS mask register TMASK 248 as per block 310. A new value to be written to EFLAGS and resulting from execution of the macro instruction is loaded into TVAL register 246 in block 315 as explained earlier in more detail. TMASK register 248 is provided with destination information as per step 320. The current privilege level is provided to TMASK register 248 such that the TMASK register is configured with a value permitting updates of the particular EFLAGS bits specified by the destination information provided an update of such bit or bits is permitted for this privilege level as per block 325. The TMASK register contents are ANDed with the new value TVAL register contents as per block 330 such that only EFLAGS bits which should be updated as permitted by the current privilege level are updated in EFLAGS as per block 335.

It was noted earlier that in conventional pipeline processors, the execution of PUSHF/PUSHFD to push the EFLAGS register to the stack requires a significant number of processor cycles. This is because reads from the EFLAGS register are conditioned on the current I/O privilege level (IOPL) and the state of certain bits within EFLAGS at the time of a write. More specifically, bits 1, 3, 5, 15 and 22–31 are reserved and their specified states cannot be altered. Moreover, the VM and RF flags of the EFLAGS register (bits 16 and 17) are not copied. Rather, the values for these flags are cleared in the EFLAGS register image that is stored on the stack.

When an x86 processor is operating in virtual-8086 mode and the I/O privilege level (IOPL) is less than 3, execution of a PUSHF/PUSHFD instruction must cause a general protection fault or exception. However, in real address mode, if the ESP register or the SP register is 1, 3, or 5 when a PUSHF/PUSHFD instruction is executed, the processor must shut down due to lack of stack space.

In a present day pipeline microprocessor such as processor 100, the execution of any of a PUSHF/PUSHFD instruction results in the generation of several micro instructions. First, a micro instruction is executed to move the contents of EFLAGS to a temporary register. Then a micro instruction is executed to clear the VM and RF bits. Following this, a micro instruction is executed to determine the current I/O privilege level, IOPL, so that the processor knows whether or not to generate an exception or to shut down. A final micro instruction is executed to store the EFLAGS image back on the stack.

One significant disadvantage of the conventional microprocessor discussed immediately above is that numerous microinstructions must be executed to perform a push of EFLAGS onto the stack. Some of these many micro instructions are needed because the current I/O privilege level (IOPL) must be queried before moving EFLAGS to the stack. Some of these micro instructions also result from the necessity of clearing certain bits in EFLAGS prior to the push. Still more micro instructions must be generated because present day pipeline processor architectures are not well suited to support execution of an instruction that requires both an ALU operation and a store operation. Today's known execution stage logic allows only exclusive performance of an ALU and memory access operations. Thus, any instruction that prescribes an ALU-type operation followed by a store-type operation must generate two successive micro instructions to perform these two operations in successive separate machine cycles. The inventors have observed that in an operating system such as Microsoft Windows® the EFLAGS register is pushed onto the stack upon each call to a subroutine. Since calls are frequently employed, it is very desirable to reduce the execution time associated with pushing EFLAGS onto the stack.

Figure 4:
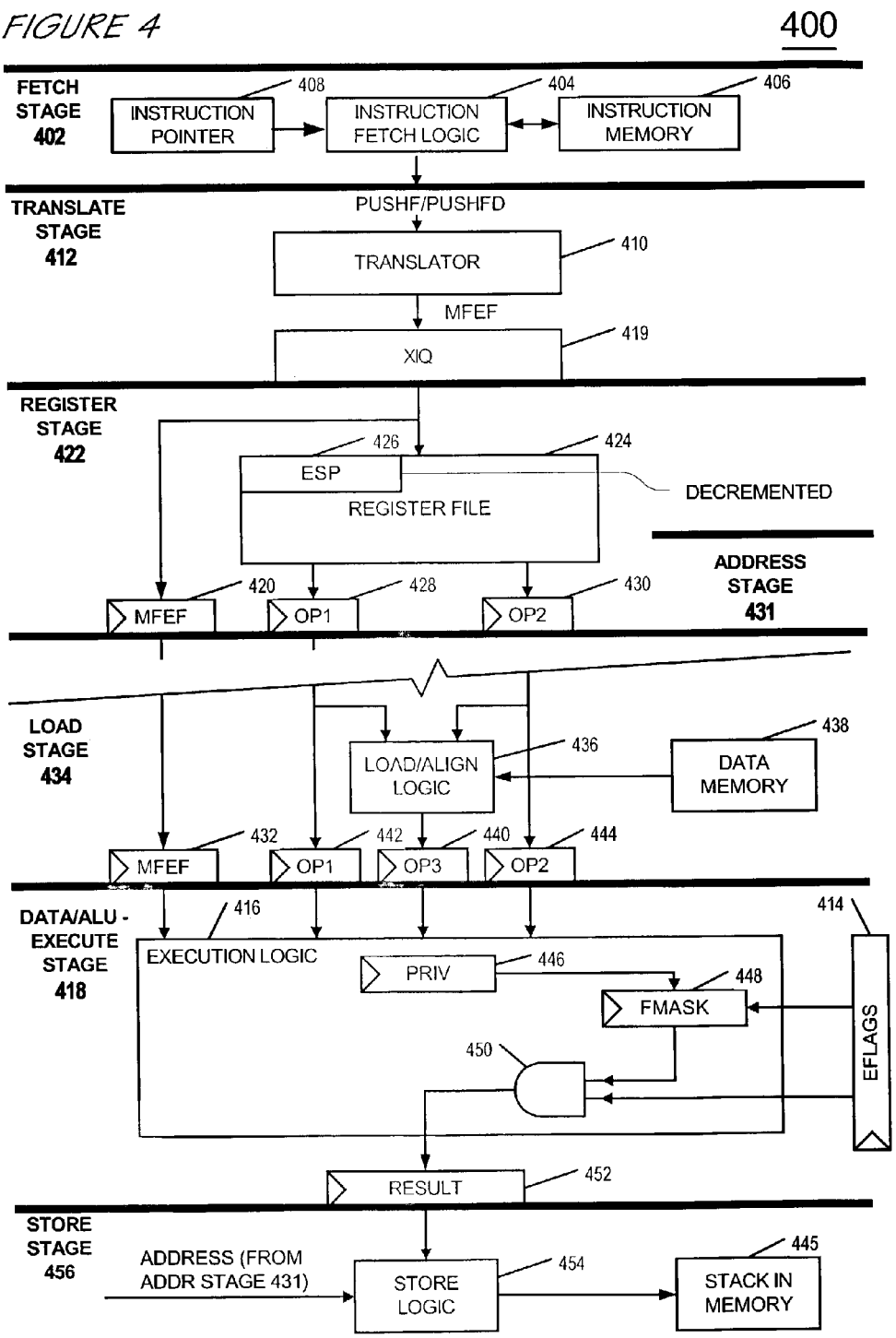
FIG. 4 is a block diagram of another embodiment of the disclosed microprocessor.

Advantageously, processor 400 shown in FIG. 4 provides a single micro instruction, Move From EFLAGS (MFEF), to move the contents of EFLAGS register 414 to the stack. Execution logic 416 in data/ALU or execute stage 418 and a load-ALU store pipeline architecture enables a push of EFLAGS to be carried out in a single instruction cycle. Significant improvement in processor efficiency is thus achieved.

Processor 400 includes a fetch stage 402 which incorporates instruction fetch logic 404 coupled to instruction memory 406. An instruction pointer 408 is coupled to fetch logic 404 to instruct fetch logic 404 as to the particular location in instruction memory 406 from which the current instruction is to be fetched.

When fetch logic 404 fetches a macro instruction such as an PUSHF/PUSHFD instruction, translator 410 of translate stage 412 in response generates an MFEF micro instruction which will implement a move from EFLAGS register 414 in data/ALU—execute stage 418.

The MFEF micro instruction is provided to translate instruction queue (XIQ) 419 as shown. The MFEF micro instruction flows forward to an MFEF register 420 in register stage 422. Register stage 422 includes a register file 424 which stores the architectural state of processor 400. Register file 424 includes an stack pointer register ESP 426. Register stage 422 also includes OP1 register 428 and OP2 register 430 as shown. Address stage 431 is depicted adjacent register stage 422. Address stage 431 calculates addresses of stored values so that they can be retrieved from memory and written to memory.

The contents of MFEF register 420 are fed forward and stored in a corresponding MFEF register 432 in load stage 434. Load stage 434 includes load/align logic 436 which is coupled to OP1 register 428 and OP2 register 430 of register stage 422 as shown. Load align logic 436 is coupled to data memory 438. The output of load/align logic 436 is coupled to OP3 register 440. The contents of OP1 register 428 and OP2 register 430 of register stage 422 are fed forward to OP1 register 442 and OP2 register 444 of load stage 232 as shown.

MFEF register 432, OP1 register 442, OP2 register 444 and OP3 register 440 are coupled to execution logic 416 in data/ALU execute stage 418 such that the values in each of these registers are provided to execution logic 416.

The progress of the MFEF micro instruction from translate stage 412 to the data/ALU execute stage 418 is now discussed. When translator 410 receives a PUSHF or PUSHFD instruction, in response it generates an MFEF micro instruction at its output. The MFEF micro instruction directs processor 400 to decrement and read, and further directs stack pointer register ESP 426 to read EFLAGS register 414 and dynamically modify its EFLAGS image as a function of the current operating mode. This EFLAGS image is then stored to the stack in memory 445.

Execution logic 416 in data/ALU execute stage 418 includes a privilege register PRIV 446 which stores the privilege or IOPL of the instruction currently being executed. The privilege register PRIV 446 is coupled to FMASK register 468 such that the current IOPL is one input to FMASK register 448. EFLAGS register 414 is coupled to FMASK register 448 to provide a second input to FMASK register 448. Execution logic 416 provides for a mask, namely FMASK, which is dynamically generated upon execution of an MFEF micro instruction. In one embodiment, the mask includes the same number of bits as the EFLAGS register. If a particular mask bit is set, this means that it can be updated whereas if a particular mask bit is not set, it can not be updated, as per the current privilege level provided by PRIV register 446. Execution logic 416 accesses the current operating mode from privilege register PRIV 446 and the state of the other bits from the EFLAGS register 414. The contents of EFLAGS register 414 is then read and ANDed with FMASK to produce a result which is stored in result register 452. In more detail, the output of FMASK register 448 is coupled to one input of AND gate 450. The remaining input of AND gate 450 is coupled to EFLAGS register 414.

During the next machine cycle, the result stored in result register 452 is written to the stack in memory at the address specified by ESP register 426. Temporary storage of the EFLAGS image is not required because the result is provided to store logic 454 in store stage 456 during the following machine cycle. Store logic 454 sends the result to storage in the stack in memory 445.

Advantageously, processor 400 can execute a PUSHF—PUSHFD instruction in a single instruction cycle thus significantly increasing processor throughput and efficiency.

Figure 5:
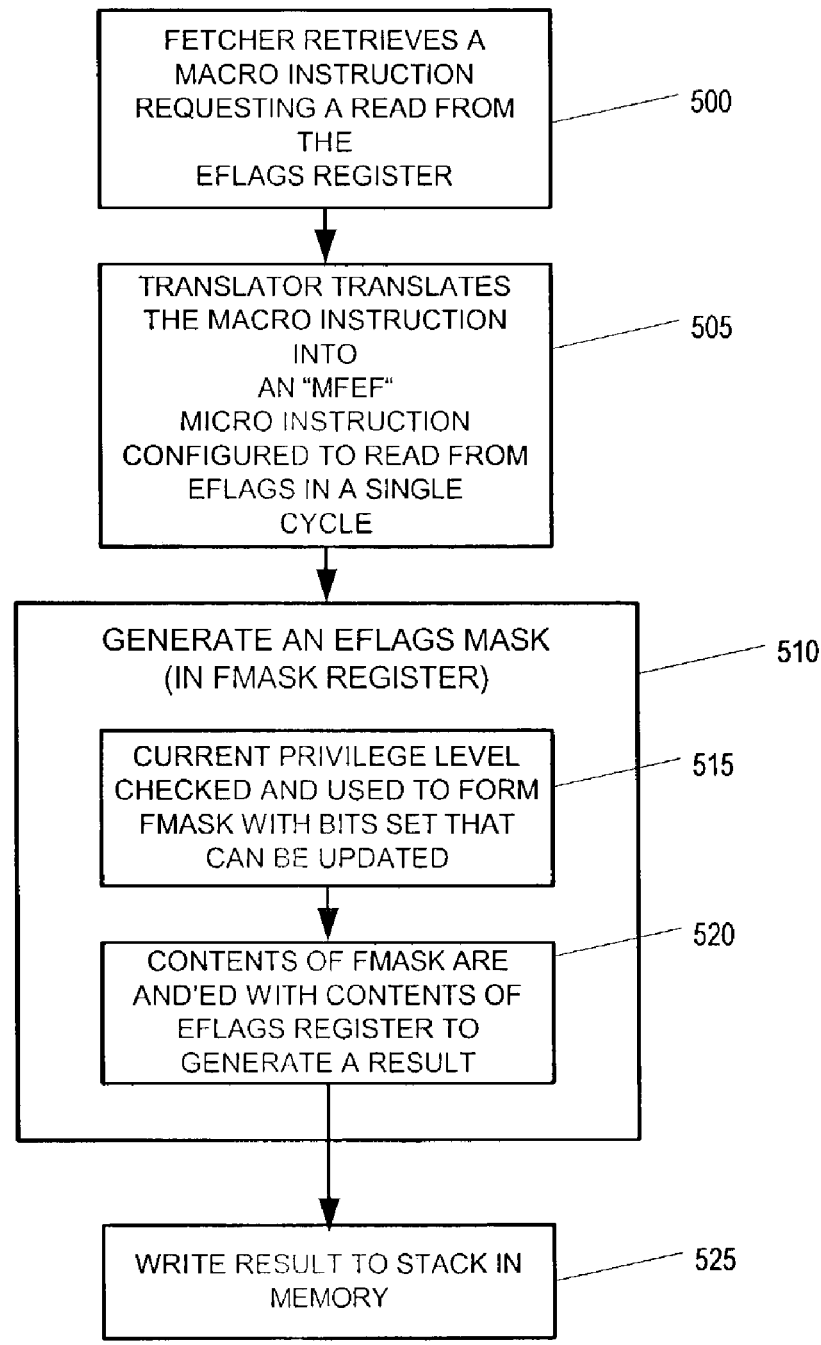
FIG. 5 is a flow chart depicting the operation of the microprocessor of FIG. 4.

FIG. 5 is a flowchart depicting process flow of microprocessor 400 as it carries out a read from EFLAGS operation to do a push to the stack in accordance with the advanced methodology disclosed. In one embodiment, the fetcher 404 retrieves a PUSHF or PUSHFD macro instruction from instruction memory. In this manner an instruction has been fetched which requires a read from the EFLAGS register 414 as per block 500 prior to being transferred to the stack. Block 505 shows that translator 410 translates the macro instruction into an MFEF micro instruction configured to read from the EFLAGS register in a single micro instruction cycle. As per block 510 an EFLAGS mask is now generated in FMASK register 448. In one embodiment, the EFLAGS mask has the same number of bits as EFLAGS itself. Thus there is a one-to-one correspondence between the bits of the EFLAGS mask in the FMASK register and the bits in the EFLAGS register. To generate the EFLAGS mask as in block 515, execution logic 416 checks the current privilege level and sets the those bits of the mask that correspond to the particular EFLAGS bits for which updating is permitted according to the particular current privilege level. The remaining bits in the mask that correspond to EFLAGS bits that can not be updated are left unset or equal to zero. The mask is then ANDed with the contents of the EFLAGS register as per block 520 and the result is written to the stack as per block 525.

The above description with reference to FIGS. 2–3 has illustrated an apparatus and a method for increasing the efficiency of a processor which is executing a write to the EFLAGS register. The above description with reference to FIGS. 4–5 has illustrated an apparatus and a method for increasing the efficiency of a processor which is executing read from the EFLAGS register. Advantageously the write to EFLAGS, and read from EFLAGS, operations can now be carried out in a single instruction cycle rather than the multiple cycles required by past processors.

Although the present invention and its objects, features, and advantages have been described in detail, other embodiments are encompassed by the invention. In addition to implementations of the invention using hardware, the invention can be embodied in computer readable program code (e.g., software) disposed, for example, in a computer usable (e.g., readable) medium configured to store the code. The code causes the enablement of the functions, fabrication, modeling, simulation and/or testing, of the invention disclosed herein. For example, this can be accomplished through the use of computer readable program code in the form of general programming languages (e.g., C, C++, etc.), GDSII, hardware description languages (HDL) including Verilog HDL, VHDL, AHDL (Altera Hardware Description Language) and so on, or other databases, programming and/or circuit (i.e., schematic) capture tools available in the art. The code can be disposed in any known computer usable medium including semiconductor memory, magnetic disk, optical disc (e.g., CD-ROM, DVD-ROM, etc.) and as a computer data signal embodied in a computer usable (e.g., readable) transmission medium (e.g., carrier wave or any other medium including digital, optical or analog-based medium). As such, the code can be transmitted over communication networks including the Internet and intranets. It is understood that the functions accomplished and/or structure provided by the invention as described above can be represented in a processor that is embodied in code (e.g., HDL, GDSII, etc.) and may be transformed to hardware as part of the production of integrated circuits. Also, the invention may be embodied as a combination of hardware and code.

Moreover, although the present invention has been described with reference to particular apparatus and method, other alternative embodiments may used without departing from the scope of the invention.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A method for performing a write operation to a multi-bit flag register in a microprocessor, the method comprising:
   receiving, by a translate stage, a macro instruction requesting a write to the multi-bit flag register;
   generating, by the translate stage, a micro instruction that directs execution logic within the microprocessor to write to the multi-bit flag register in a single write cycle; and
   accessing a current operating mode and configuring a flag mask that permits updates of particular bits within the multi-bit flag register that are appropriate for the current operating mode.

2. The method as recited in claim 1, further comprising:
   ANDing the flag mask with a prescribed operand to generate a result.

3. The method as recited in claim 2, further comprising:
   storing the result in the multi-bit flag register.

4. The method as recited in claim 1, wherein the microprocessor comprises an x86-compatible microprocessor.

5. The method as recited in claim 4, wherein the multi-bit flag register is an EFLAGS register within the x86-compatible microprocessor.

6. The method as recited in claim 1, wherein the macro instruction comprises one of the group comprising x86 macro instructions POPF, POPFD, CLI, STI, CLC, STC, CLD, and STD.

7. An apparatus in a pipeline microprocessor, for performing a write to a flags register in a single instruction cycle, the apparatus comprising:
   translation logic, configured to receive a macro instruction directing the pipeline microprocessor to perform the write to the flags register, and configured to generate a single micro instruction that directs the pipeline microprocessor to execute the write to the flags register in the single instruction cycle; and
   execution logic, coupled to said translation logic, configured to receive said single micro instruction, and configured to execute the write to the flags register in the single instruction cycle;
   wherein said execution logic accesses a current operating mode from a privilege register and the state of other bits from the flags register to dynamically generate contents of a TMASK register wherein said contents of said TMASK register are configured to allow alteration only of particular bits within the flags register as a function of said current operating mode.

8. The apparatus as recited in claim 7, wherein the pipeline microprocessor comprises an x86-compatible microprocessor and the flags register comprises an x86 EFLAGS register.

9. The apparatus as recited in claim 8, wherein said macro instruction comprises a POPF/POPFD, CLI/STI, CLC/STC, or CLD/STD x86 macro instruction.

10. The apparatus as recited in claim 7, wherein said single micro instruction comprises:
 a destination field, configured to prescribe a plurality of bits within the flags register that are to be written; and
 a source field, coupled to said destination field, configured to prescribe the state of each of said plurality of bits which are to be written.

11. The apparatus as recited claim 7, wherein said execution logic configures a TVAL register that provides a particular value to be written to the flags register as prescribed by said single micro instruction.

12. The apparatus as recited in claim 11, wherein said execution logic performs a logical AND operation on said contents of said TMASK and TVAL registers to yield a result and wherein said result is written to the flags register.

13. The apparatus as recited in claim 7, wherein said privilege register comprises an x86 PRIV register.

* * * * *